US012457012B2

(12) United States Patent
van der Weide et al.

(10) Patent No.: US 12,457,012 B2
(45) Date of Patent: Oct. 28, 2025

(54) HIGH-PERFORMANCE PROBE FOR NEAR-FIELD ANTENNA MEASUREMENT

(71) Applicant: vdW Design, LLC, Madison, WI (US)

(72) Inventors: Daniel W. van der Weide, Madison, WI (US); Mohammadreza Ranjbar Naeini, Madison, WI (US)

(73) Assignee: vdW Design, LLC, Madison, WI (US)

( * ) Notice: Subject to any disclaimer, the term of this patent is extended or adjusted under 35 U.S.C. 154(b) by 0 days.

(21) Appl. No.: 18/364,328

(22) Filed: Aug. 2, 2023

(65) Prior Publication Data
US 2024/0048182 A1 Feb. 8, 2024

Related U.S. Application Data

(63) Continuation of application No. 17/111,858, filed on Dec. 4, 2020, now abandoned.

(60) Provisional application No. 62/943,616, filed on Dec. 4, 2019.

(51) Int. Cl.
*H03M 1/10* (2006.01)
*H04B 5/26* (2024.01)
*H04B 5/73* (2024.01)

(52) U.S. Cl.
CPC ................ *H04B 5/73* (2024.01); *H04B 5/26* (2024.01)

(58) Field of Classification Search
CPC .... H04B 5/0043; H04B 5/0081; H04B 17/00; G01Q 70/16; Y10S 977/862; H03M 1/10; H03M 1/1071; G01R 31/3025
See application file for complete search history.

(56) References Cited

U.S. PATENT DOCUMENTS

| | | | | |
|---|---|---|---|---|
| 6,201,453 | B1* | 3/2001 | Chan | ...................... H01P 5/107 333/248 |
| 2004/0185811 | A1* | 9/2004 | Woo | ........................ H04B 1/08 455/131 |
| 2019/0086459 | A1* | 3/2019 | Alavi | ..................... G01R 29/10 |
| 2019/0131721 | A1* | 5/2019 | Dani | ........................ H01Q 21/24 |
| 2019/0207286 | A1 | 7/2019 | Moallem | |
| 2020/0028259 | A1* | 1/2020 | Wang | .................... G01S 13/584 |
| 2021/0356504 | A1* | 11/2021 | Bencivenni | ........... H01Q 3/267 |

OTHER PUBLICATIONS

Alonso-Delpino et al., "A planar near-field setup for millimeterwave system-embedded antenna testing," IEEE Antennas and Wireless Propagation Letters, 16: 83-86 (Apr. 2016).
Francis et al., "Near-field scanning measurements: Theory and practice," Modern Antenna Handbook, pp. 929-976 (Nov. 2007).
Gittinger, A Plane Intersecting a Cube, GeoGebra, https://www.geogebra.org/m/aY75dEkf, downloaded Jan. 27, 2023.

(Continued)

*Primary Examiner* — Angelica Perez
(74) *Attorney, Agent, or Firm* — David W. Staple; Casimir Jones, S.C.

(57) ABSTRACT

Provided herein are high-performance, compact probes for use in near-field antenna measurement, such as over-the-air antenna measurements. In particular, the probes herein simplify detection by mixing the near-field radio frequency (RF) signal with a local oscillator (LO) right at the probe plane.

18 Claims, 6 Drawing Sheets

(56) References Cited

OTHER PUBLICATIONS

Jokinen et al., "Over-the-air phase measurement and calibration method for 5g mmw phased array radio transceiver," in 2019 93rd ARFTG Microwave Measurement Conference (ARFTG), pp. 1-4 (Jun. 2019).
Kittiwittayapong et al., "Low-cost planar near-field to far-field measurement system for a small antenna," in 2016 13th International Conference on Electrical Engineering/Electronics, Computer, Telecommunications and Information Technology (ECTI-CON), pp. 1-3 (Jun. 2016).
Liang et al., "A probe for making near-field measurements with minimal disturbance: the optically modulated scatterer," IEEE Transactions on Antennas and Propagation, 45(5): 772-780 (May 1997).
Moon et al., "The design of broadband probe for efficient near field measurements," IEEE Antennas and Wireless Propagation Letters, 6:440-443 (Sep. 2007).
Naeini et al., "Monolithic 3-D-printing of an integrated marchand balun with a dipole antenna," IEEE Transactions on Components, Packaging and Manufacturing Technology, 10(4):1-5 (Jan. 2020).
Naeini et al., "Cascaded 3-D-printed X-band components for subsystems," IEEE Microwave and Wireless Components Letters, 29(5):333-335 (May 2019).
Paris et al., "Basic theory of probe-compensated near-field measurements," IEEE Transactions on Antennas and Propagation, 26(3):373-379 (May 1978).

\* cited by examiner

HIGH-PERFORMANCE PROBE FOR NEAR-FIELD ANTENNA MEASUREMENT

CROSS-REFERENCE TO RELATED APPLICATION

The present invention is a continuation of U.S. patent application Ser. No. 17/111,858, filed Dec. 4, 2020, which claims priority to U.S. Provisional Patent Application Ser. No. 62/943,616 filed Dec. 4, 2019, which is hereby incorporated by reference in its entirety.

FIELD

Provided herein are high-performance, compact probes for use in near-field antenna measurements, such as over-the-air antenna measurements. In particular, the probes herein simplify detection by mixing the near-field radio frequency (RF) signal with a local oscillator (LO) at the probe plane.

BACKGROUND

Mobile-device antennas are packaged and surrounded by circuits, rendering impractical conventional methods of antenna measurement that use bulky connectors. Over-the-Air measurement systems are of interest for modern electronic systems devices that are highly integrated [Ref. 1; incorporated herein by reference in its entirety]. For instance, current and future mobile-device antennas are packaged and surrounded by circuits, rendering impractical conventional methods of antenna measurement that use bulky connectors. Furthermore, moving toward the 5G millimeter-wave spectrum, far-field measurements need a large chamber if the device under test is large compared to the wavelength, e.g. a small-cell base station. Therefore, there is a demand for a method to measure near-field radiation of the antenna with low loss, quickly and at low cost. The conventional methods of near-field measurement require a vector network analyzer or at least a signal generator and a spectrum analyzer. At millimeter-wave, acquiring such a setup could be expensive.

Near-field antenna measurement is usually done in different coordinates and using different probe types. In [Ref. 2; incorporated by reference in its entirety], a wideband probe is designed based on an exponentially tapered ridge in the rectangular waveguide. In [Ref. 3; incorporated by reference in its entirety], an optically modulated scatterer is designed to be used as an electric-field probe. It can get close to the objects without disturbing the field. In addition, open-ended waveguide is widely used as an electric-field probe in different near-field measurement setups [Refs. 4-5; incorporated by reference in their entireties]. None of these solutions has the ability to simplify the near-field measurement and data acquisition setup. In addition, they cannot be expanded to a probe array to speed up near-field scan because they are bulky.

SUMMARY

Provided herein are high-performance, compact probes for use in near-field antenna measurement. In particular, the probes herein simplify detection by mixing the near-field radio frequency (RF) signal with a local oscillator (LO) right at the probe plane. By down-converting the near-field signal at the probe location, the output signal can be analyzed with a simple setup rather than a high frequency spectrum analyzer.

In some embodiments, the mixer is a self-biased diode quad located on the probe, which receives the near-field RF signal; the LO is fed through a rectangular waveguide, coupled to a slot, and then transferred to the mixer through via holes. The RF and LO signals are mixed directly at the probe and the output intermediate frequency (IF) is used for near- to far-field calculation.

In some embodiments, provided herein are probes comprising: (a) a top layer comprising an antenna for transducing an electric or magnetic field (and/or for a near-field measurement); (b) a bottom layer comprising an aperture; and (c) a middle layer comprising a ground plane for the antenna. In some embodiments, the aperture is oriented at an angle of 0-90 degrees (e.g., 0°, 10°, 20°, 30°, 40°, 50°, 60°, 70°, 80°, 90°, or ranges therebetween (e.g., 30-60 degrees)). In some embodiments, the aperture is oriented at an angle of 45 degrees.

In some embodiments, provided herein are probes comprising an RF antenna, a mixer at the probe plane, a waveguide coupled to an aperture. In some embodiments, the waveguide is a substantially-rectangular waveguide (e.g., having shape and/or dimensions (e.g., side lengths and/or angles) within 5% (e.g., within 4%, within 3%, within 2%, within 1%) of rectangular). In some embodiments, the waveguide is a rectangular waveguide. In some embodiments, the waveguide is a coaxial and/or coplanar waveguide. In some embodiments, the waveguide is a substrate-integrated waveguide (SIW). In some embodiments, the RF antenna is a slot or slot-like antenna.)). In some embodiments, the slot is oriented at an angle of 0-90 degrees (e.g., 0°, 10°, 20°, 30°, 40°, 50°, 60°, 70°, 80°, 90°, or ranges therebetween (e.g., 30-60 degrees)). In some embodiments, the slot is oriented at an angle of 45 degrees. In some embodiments, a local oscillator (LO) signal is fed through a rectangular waveguide, coupled to a slot or slot-like antenna, and then transferred to the mixer for mixing with an RF signal from the RF antennae to generate an output intermediate frequency (IF).

In some embodiments, provided herein are methods of measuring near-field radiation comprising mixing a near-field radio frequency (RF) signal with a local oscillator (LO) signal to generate an output intermediate frequency (IF). In some embodiments, the RF and LO signals are mixed directly on a probe. In some embodiments, the IF is used for near- to far-field calculation.

DETAILED DESCRIPTION

Provided herein are high-performance, compact probes for use in near-field antenna measurement. In particular, the probes herein simplify detection by mixing the near-field radio frequency (RF) signal with a local oscillator (LO) right at the probe plane.

Provided herein is a high-performance, compact and low-cost probe for near-field antenna measurement. In some embodiments, the near-field antenna measurement is an over-the-air antenna measurement. By down-converting the near-field signal right at the probe location, the output signal can be analyzed with a simple setup rather than a high frequency network analyzer.

Figure 1:
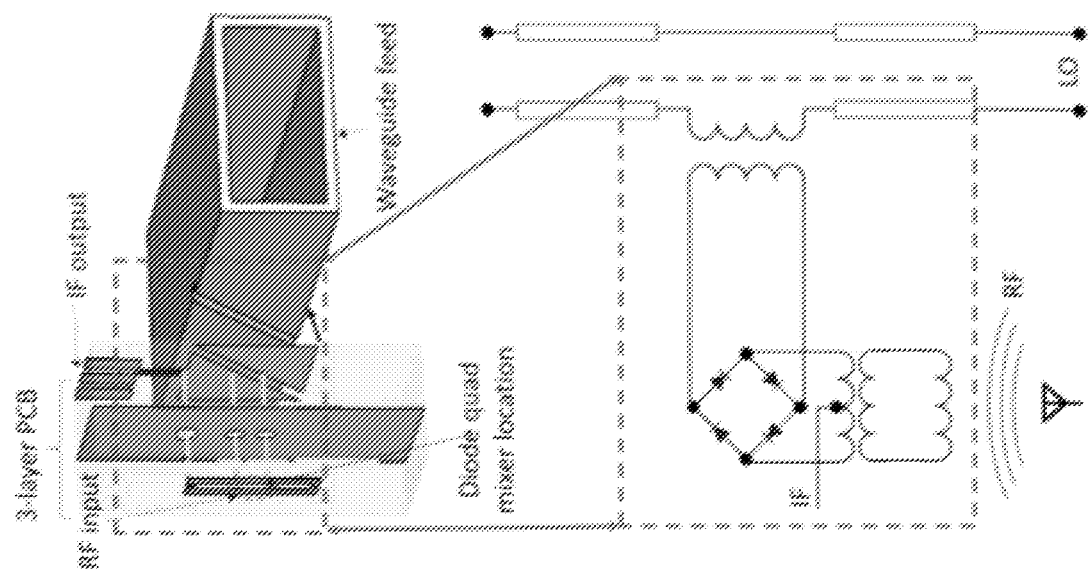
FIG. 1. Schematic of an exemplary probe with a diode quad mixer, a transmission line and couplers.

For high performance, the RF signal should be down-converted as close as possible to the probe. To do so, the mixer should be placed right at the probe and the LO signal should illuminate the probe as well. To simplify the system a diode quad mixer can be used, which is self-biased, requiring neither bias lines nor a separate power supply. The LO is transferred to the mixer through waveguide transmission. The unbalanced IF signal is taken out from the transformer on the RF or LO side as shown in FIG. 1.

In some embodiments, the probe comprises three layers. On the top layer, there is a slot antenna for nearfield signal measurement, on the bottom layer, a 45-degree oriented slot for coupling the LO from a slot cut on a sidewall of the waveguide, and the middle layer is ground plane for the top slot, which also isolates RF to LO leakage and vice versa. The slot may be oriented at other suitable angles. For example, the slot may be oriented at an angle of 10-80 degrees (e.g., 10°, 20°, 30°, 40°, 50°, 60°, 70°, 80°, or ranges therebetween) relative to the top surface of the waveguide. There are two plated via holes attached to the middle of the 45-degree-oriented slot to transfer the LO signal to the top plane. The probe configuration is shown in FIG. 1. Narrow slits cut through the slot enable the IF signal to be routed to the edges of the slot. In practice, the slit cut transforms the balanced signal to an unbalanced one since slot antennas are inherently balanced. Two capacitors connect the separated regions of the slot to avoid decreasing the RF performance of the slot yet provide high impedance at IF. To avoid the influence of a bulky connector on the RF signal, the IF output connector is located on the back.

Figure 2:
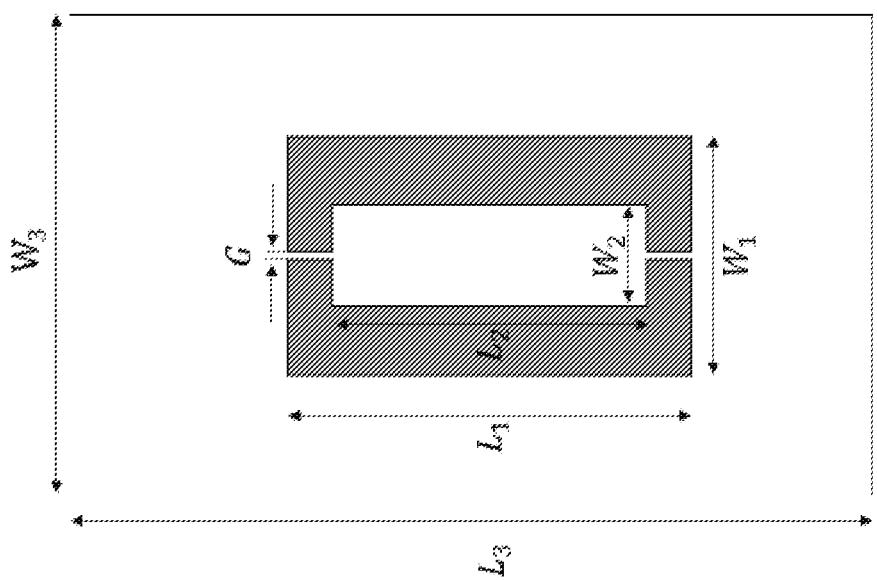
FIG. 2. Exemplary slot antenna probe.
Figures 3A, 3B:
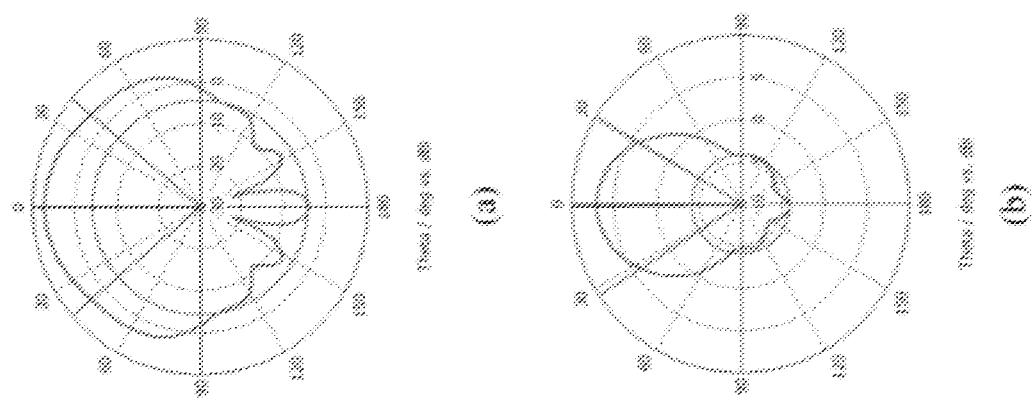
FIGS. 3A-3B. Simulated (A) E-plane and (B) H-plane far-field radiation patterns of the probe.

The primary portion of the probe is the front slot. The capacitive loading effect of the diode quad mixer may be considered in the slot probe design, resulting in a probe that covers a 5% bandwidth around 10 GHz. Detailed parameters of the slot are in FIG. 2 and values are summarized in Table 1. The probe may be fabricated on FR4 substrate, 2.4 mm for the front slot and 2 mm thick for the back slot. The front slot antenna may have 7 dBi gain in far-field with 63 degree half-power beam width (HPBW) in the H-plane. The far-field E-plane and H-plane radiation patterns of the probe are shown in FIG. 3. The effect of the non-ideal probe can be removed from the near-field data using a probe correction method [Ref. 6; incorporated by reference in its entirety].

TABLE I

DETAILED DIMENSIONS OF THE SLOT PROBE (UNIT: mm)

| Parameter | $L_1$ | $L_2$ | $L_3$ | $W_1$ | $W_2$ | $W_3$ | G |
|---|---|---|---|---|---|---|---|
| Value | 12 | 7.8 | 30 | 4 | 1.1 | 15 | 0.1 |

The back slot, which gets the LO signal from the waveguide and transfers it to the front side, may be 45-degree-oriented with a width of 1.3 mm and length of 16 mm. The same dimension of cutout in the waveguide sidewall may match the 45-degree-oriented slot on the PCB and couple the LO to it. Through two plated via holes, which pass through the middle layer, the LO drives two pads on the front slot plane where the LO port of the mixer is. Therefore, the mixer can be soldered on the front plane, mixes RF with LO, and produces output (IF) which can be taken out from the slit cut. The waveguide feed is a standard WR-90 waveguide which enables multiple probes arranged side-by-side, reducing antenna near-field measurement scan time significantly.

Figures 4A, 4B, 4C, 4D:
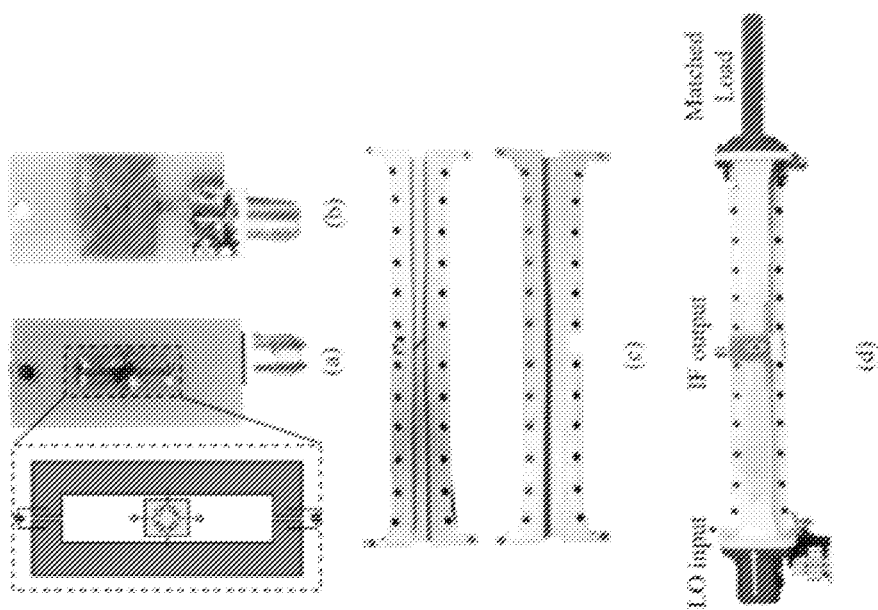
FIG. 4A-4D. Probe parts: (A) PCB top view, slot antenna including a mixer, (B) PCB bottom view, 45-degree-oriented slot and the output, (C) 3D-printed and copper coated waveguide halves, and (D) complete probe setup including a matched load connected to the end of the waveguide FIG. 5. IF (output) power for LO Power=0 dBm, and LO Power=10 dBm for different IF frequencies. At LO Power=10 dBm, the IF power is independent of IF frequency.
Figure 5:
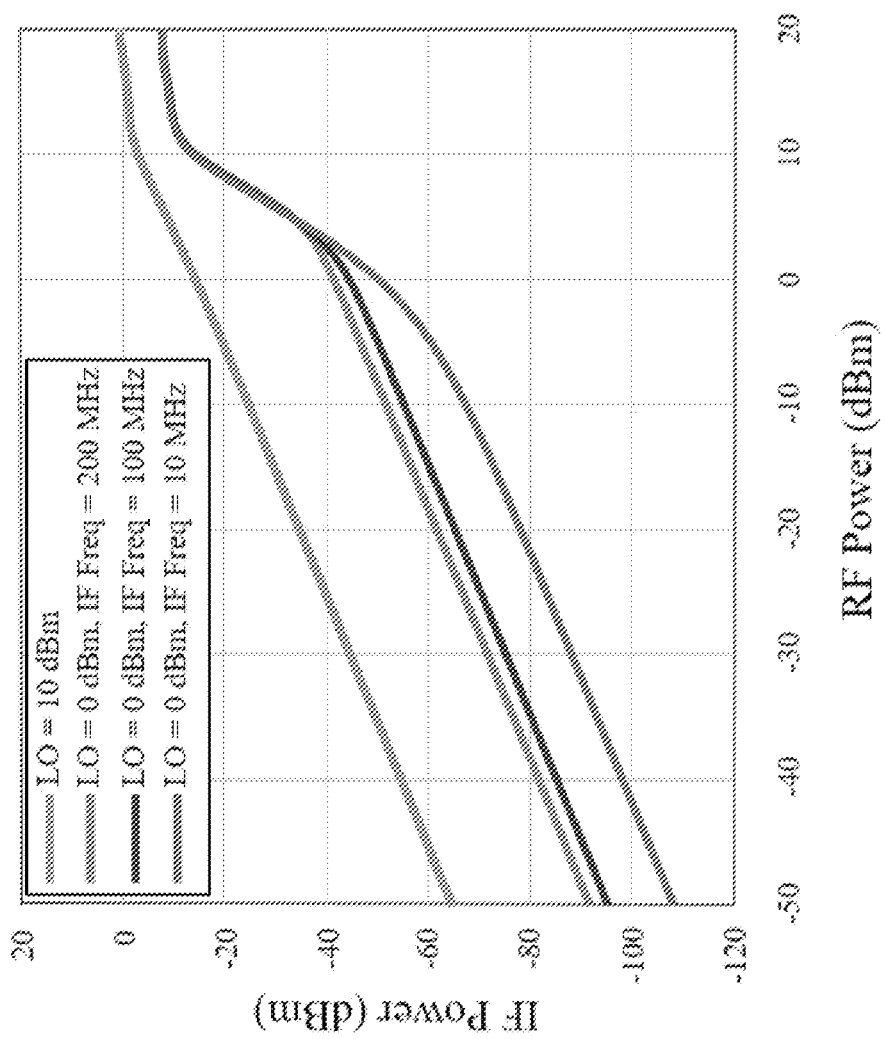

The diode quad mixer (Avago HSMS-2829) is soldered on the probe plane shown in the inset of FIG. 4A. The LO feed is a rectangular waveguide, is 3D printed and prepared using a plastic conductive coating method [Ref. 7; incorporated by reference in its entirety]. 3D printing can be used to realize a fine slot cut in one of the walls [Ref. 8; incorporated by reference in its entirety]. The complete probe setup is shown in FIG. 4. Using HSMS-2829 for the LO>10 dBm, the IF frequency does not affect the IF power. FIG. 5 shows IF at LO=10 dBm compared with LO=0 dBm. Sufficient LO power (10 dBm) (e.g. at 10 GHz) guarantees the same output power at different IF and avoids the need for power calibration at each IF.

Since there is not an RF port on the probe to measure its performance (like return loss and radiation pattern), the performance of the probe is simulated including the mixer and the waveguide feed and compared to the same measurement setup. Since the probe has a relatively large volume compared to wavelength, depending on the distance between probe and antenna under test (AUT) and the AUT aperture size, the loading effect of AUT on the probe can downgrade the performance.

Figure 6:
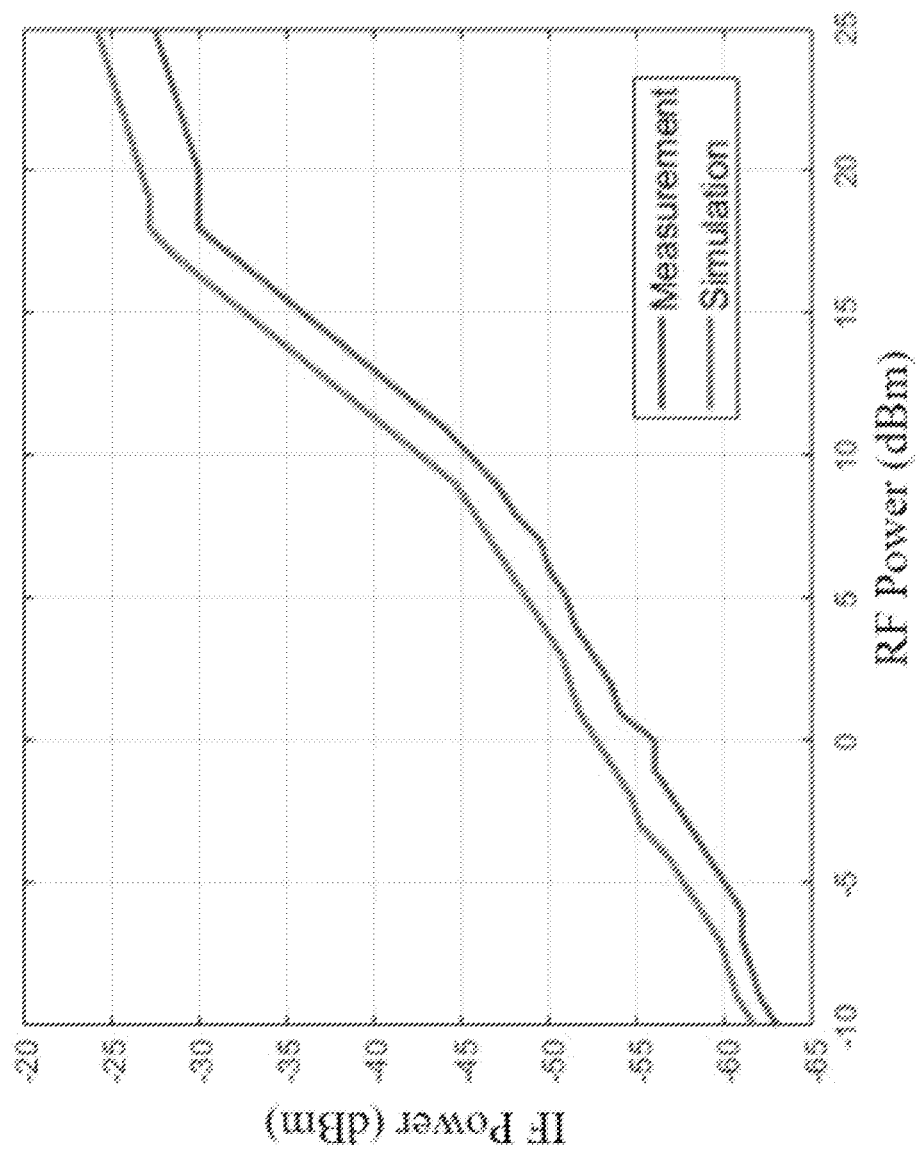
FIG. 6. Comparison of measured and simulated IF power for sweep of RF power. The RF frequency is 10.1 GHz and the LO frequency is 10 GHz with 10 dBm power at the mixer.

In one embodiment, using a signal generator, the LO frequency is set at 10 GHz, and the RF frequency is at 10.1 GHz. The LO power at the input of the waveguide is 25 dBm, but based on simulation, about 10 dBm of the input power is delivered to the mixer. The RF power is delivered to probe using an open-ended waveguide as the AUT located 5 cm far from the probe. At this distance, the AUT does not have any noticeable effect on the probe. The measured IF power at 100 MHz vs. RF power is plotted in FIG. 6 and compared with simulation. The effect of AUT and probe gain (radiation passive gain) and free space path loss are included in the simulation. The single probe measurement results are in good agreement with the simulation proving that a range of 35 dB of RF signal power can be detected. This range is suitable in near-field analysis such as an over-the-air antenna measurements [Ref. 9; incorporated herein by reference in its entirety] since the probe can cover almost all of the required area in a planar scan to collect the near-field data. Near-field antenna measurement using this probe requires calibration for actual near-field data. The measured IF power should be transformed to the corresponding actual RF power using the IF power vs. RF power relationship. Since it is a monotonic function, there is no ambiguity in finding the corresponding RF power. Using the same measured phase information at IF the near-field to far-field calculation can be done.

Provided herein are a high-performance, low-cost and compact near-field antenna measurement probes. The probe is a slot antenna with a ground plane. Mixing the near-field signal with LO at the probe plane makes the setup simple. The LO is fed through a waveguide and coupled to a 45-degree-oriented slot on the back of the probe. The waveguide is 3D printed and the probe is fabricated using a 3-layer PCB. The agreement in single probe measurement results with the simulation showing that a range of 35 dB of RF signal power can be detected. The results show that this probe can be used in a near-field antenna measurement setup with the ability to be expanded to an array of probes arranged side-by-side to facilitate a near-field antenna measurement.

REFERENCES

The following references are herein incorporated by reference in their entireties.

[1] M. Jokinen, O. Kursu, N. Tervo, J. Saloranta, M. E. Leinonen, and A. Prssinen, "Over-the-air phase measurement and calibration method for 5 g mmw phased array radio transceiver," in 2019 93rd ARFTG Microwave Measurement Conference (ARFTG), June 2019, pp. 1-4.

[2] J. Moon and J. Yun, "The design of broadband probe for efficient near field measurements," IEEE Antennas and Wireless Propagation Letters, vol. 6, pp. 440-443, 2007.

[3] W. Liang, G. Hygate, J. F. Nye, D. G. Gentle, and R. J. Cook, "A probe for making near-field measurements with minimal disturbance: the optically modulated scatterer," IEEE Transactions on Antennas and Propagation, vol. 45, no. 5, pp. 772-780, May 1997.

[4] S. Kittiwittayapong, K. Phaebua, P. Sittithai, and T. Lertwiriyaprapa, "Low-cost planar near-field to far-field measurement system for a small antenna," in 2016 13th International Conference on Electrical Engineering/Electronics, Computer, Telecommunications and Information Technology (ECTI-CON), June 2016, pp. 1-3.

[5] M. Alonso-delPino, M. d. Rosa, M. Simeoni, M. Spella, C. De Martino, and M. Spirito, "A planar near-field setup for millimeterwave system-embedded antenna testing," IEEE Antennas and Wireless Propagation Letters, vol. 16, pp. 83-86, 2017.

[6] D. Paris, W. Leach, and E. Joy, "Basic theory of probe-compensated near-field measurements," IEEE Transactions on Antennas and Propagation, vol. 26, no. 3, pp. 373-379, May 1978.

[7] M. Ranjbar Naeini and D. van der Weide, "Cascaded 3-D-printed X-band components for subsystems," IEEE Microwave and Wireless Components Letters, vol. 29, no. 5, pp. 333-335, May 2019.

[8] M. Ranjbar Naeini, M. Mirmozafari, and D. Van der Weide, "Monolithic 3-D-printing of an integrated march-and balun with a dipole antenna," IEEE Transactions on Components, Packaging and Manufacturing Technology, pp. 1-1, 2020.

[9] M. H. Francis and R. C. Wittmann, "Near-field scanning measurements: Theory and practice," pp. 929-976, 2007.

The invention claimed is:

1. A probe comprising a 3-layer printed circuit board having:
 (a) a top layer comprising a front slot antenna for receiving an radio frequency (RF) signal from an antenna under test (AUT);
 (b) a mixer located within the front slot antenna that receives the RF signal and receives a local oscillator (LO) signal and produces an intermediate frequency (IF) signal;
 (c) a middle layer comprising a ground plane; and
 (d) a bottom layer comprising a back LO aperture for receiving the LO signal wherein the back LO aperture comprises a back slot; and
 (e) a waveguide adapted to carry the LO signal and having a waveguide wall slot, and wherein the back slot is aligned with the waveguide wall slot to convey the LO signal through the back slot.

2. The probe of claim 1, wherein the mixer is a diode quad mixer.

3. The probe of claim 1, wherein the mixer is mounted to the top layer.

4. The probe of claim 1, wherein the mixer is mounted to the top layer by soldering.

5. The probe of claim 1, wherein the middle layer includes at least one via hole for passing the LO signal from the back LO aperture to the mixer.

6. The probe of claim 5, wherein the middle layer includes at least one via hole for passing the IF signal from the mixer to an IF output.

7. The probe of claim 1, wherein the mixer is positioned inside the top layer.

8. The probe of claim 1, wherein the mixer is positioned outside the top layer.

9. The probe of claim 8, wherein the mixer is positioned between the top layer and the middle layer.

10. The probe of claim 8, wherein the mixer is positioned above the top layer.

11. The probe of claim 1, wherein the back slot is oriented at 45 degrees relative to the front slot antenna.

12. A probe comprising a 3-layer printed circuit board having:
 (a) a top layer comprising a front slot antenna for receiving an radio frequency (RF) signal from an antenna under test (AUT);
 (b) a mixer mounted to the top layer that receives the RF signal and receives a local oscillator (LO) signal and produces an intermediate frequency (IF) signal;
 (c) a middle layer comprising a ground plane;
 (d) a bottom layer comprising a back LO aperture for receiving the LO signal wherein the back LO aperture comprises a back slot; and
 (e) a waveguide adapted to carry the LO signal and having a waveguide wall slot, and wherein the back slot is aligned with the waveguide wall slot to convey the LO signal through the back slot.

13. The probe of claim 12, wherein the mixer is a diode quad mixer.

14. The probe of claim 13, wherein the mixer is mounted to the top layer by soldering.

15. The probe of claim 12, wherein the mixer is positioned inside the top layer.

16. The probe of claim 12, wherein the mixer is positioned outside the top layer.

17. The probe of claim 16, wherein the mixer is positioned between the top layer and the bottom layer.

18. The probe of claim 16, wherein the mixer is positioned above the top layer.

* * * * *